J. B. WEBSTER.
Seed Planter.
No. 77,141.                                                               Patented April 21, 1868.
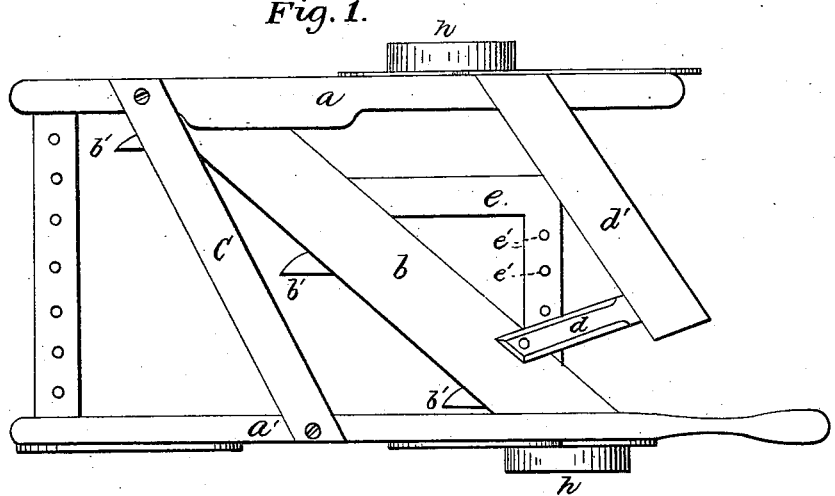
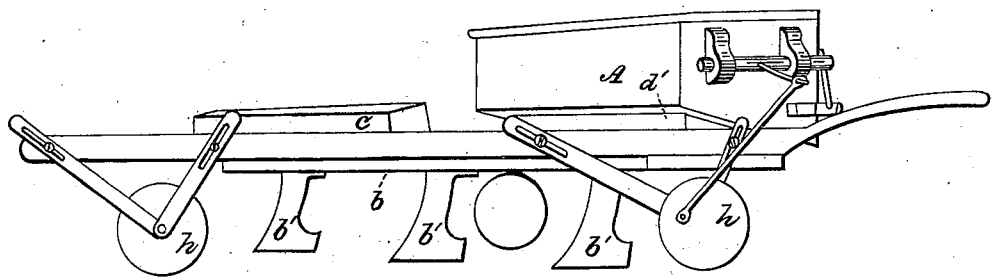
Witnesses:
H. W. Beadle.
Frederic Thomas
Inventor:
J. B. Webster
by Geo. E. Brown
Atty.

United States Patent Office.

J. B. WEBSTER, OF STOCKTON, CALIFORNIA.

Letters Patent No. 77,141, dated April 21, 1868.

IMPROVEMENT IN SEED-SOWER AND HARROW-ATTACHMENT TO GANG-PLOUGHS.

The Schedule referred to in these Letters Patent and making part of the same.

TO ALL WHOM IT MAY CONCERN:

Be it known that I, J. B. WEBSTER, of Stockton, in the State of California, have invented a new and useful Improvement in Seeder and Harrow-Attachments for Plough-Frames; and do hereby declare that the following is a full, clear, and exact description of the same, reference being had to the accompanying drawings, and letters of reference marked thereon, making a part of this specification, in which—

Figure 1 is a plan view of my plough-frame, the seeder being removed.

Figure 2 is a side elevation, showing the seeder in connection with the plough-frame, and the means of operating the former.

This invention consists of a plough-frame arranged for supporting a seeder in two different positions with respect to the ploughs, and provided with a harrow-attachment, as will hereinafter more fully appear.

To enable those skilled in the art to make and use my invention, I now proceed to describe its construction and operation.

Similar letters in the drawings refer to like parts.

My plough-frame consists of two side beams $a\ a'$, of suitable dimensions, and parallel with each other, and a diagonal plank, $b$, connecting the beams $a$, for the attachment of ploughs $b'\ b'\ b'$, as many as may be desired.

A diagonal beam, $c$, is also attached, at each end, to one of the beams $a$, and rests upon the same, in front of the plough-beam $b$, said beam $c$ having its upper surface sloping forward, in order to afford suitable support to the hopper A, whose bottom is inclined in an equal degree, whenever it is desired to place said hopper, with its seeding-machinery, upon the front part of the frame, in order that the seed may be deposited before the ploughs $b'$, and be covered by them, which is the practice in California whenever the soil is sufficiently dry.

A wooden framework, consisting of two pieces $d\ d'$, is attached to the rear end of my main frame, the piece $d$ being suitably secured at one end upon the plank $b$, and projecting to the rear of the same sufficiently far to form a support for one end of the piece $d'$, the other end of which is attached to the side beam $a$. Upon the piece $d'$, the upper surface of which is properly inclined for the purpose, rests the hopper A, whenever it is desired that the same shall be placed upon the rear part of the frame, in order that the seed may be deposited behind the ploughs and covered by a harrow immediately following, which is the best method when the soil is considerably moist.

To the under side of the plank $b$ is attached a metallic bracket, $e$, which may conveniently be L-shaped, as shown, and pierced with holes $e'\ e''$, &c., for the insertion of a hook connected with a harrow.

My plough-frame moves upon wheels $h$, in the ordinary manner.

Having thus fully described my invention, what I claim as new, and desire to secure by Letters Patent, is—

1. The plough-frame $a\ a'\ b$, provided with means for attaching a seeder to its front end, and provided also with the frame $d\ d'$, at its rear end, for the attachment of a seeder, substantially as described.

2. The bracket $e$, in combination with the plough-frame $a\ a'\ b$, as and for the purpose described.

J. B. WEBSTER.

Witnesses:
H. A. GASTON,
L. HOWARD.